March 15, 1927.
S. C. CUTTER
1,620,804
INSULATOR
Filed Aug. 13, 1924
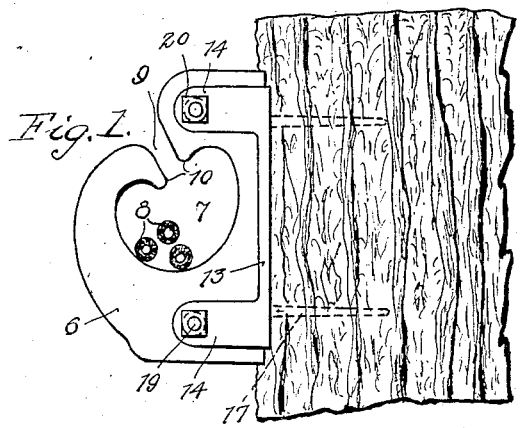
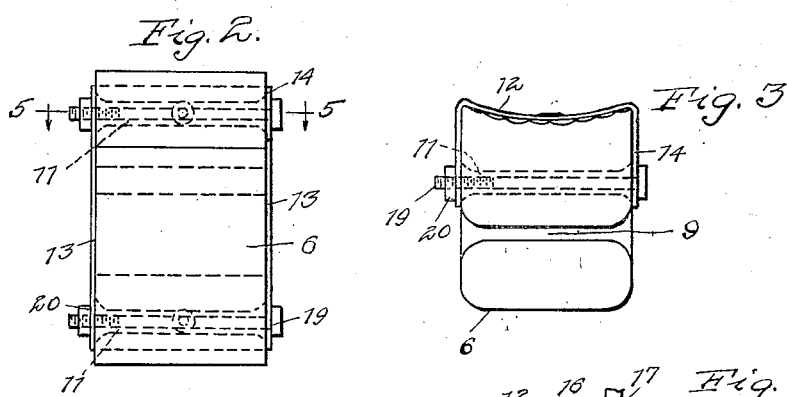
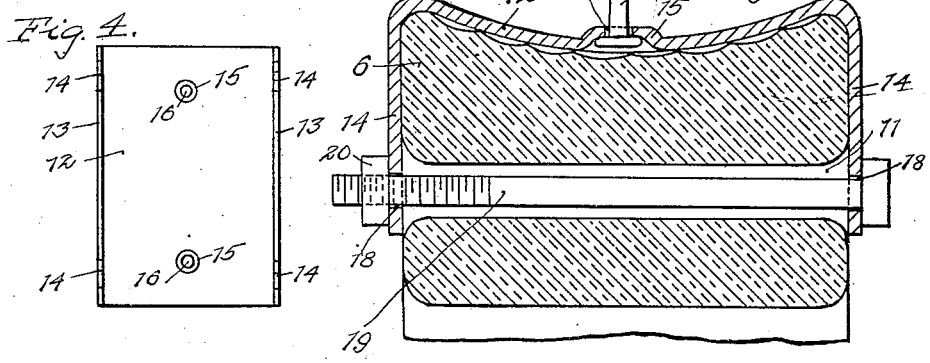
Inventor
Scott C. Cutter
By Brown, Boettcher & Diemer
Attys.

Patented Mar. 15, 1927.

1,620,804

UNITED STATES PATENT OFFICE.

SCOTT C. CUTTER, OF OSWEGO, ILLINOIS.

INSULATOR.

Application filed August 13, 1924. Serial No. 731,731.

My invention relates to electrical insulators and particularly to that type of electrical insulators which are adapted to be attached to the side of a tree trunk or limb, either because the tree is to be used as a support or because it is an obstruction, or both, in order to protect the same and to support and protect current carrying wires. Types of such insulators are shown in my United States Letters Patent No. 758,175, dated April 26, 1904, and in my copending application for United States Letters Patent, Serial No. 651,269, filed July 13, 1923.

It is the practice to secure these insulators to a tree trunk or limb by means of wires or the like girdling the trunk or limb, but there is frequently objection to this girdling, and the primary object of my present invention is to provide means for securing the insulator to the trunk or limb without girdling it. Secondarily, it is my object to provide such means that the insulator per se may also be adapted for attachment by girdling, thus giving the user the choice of supporting the insulator in either way. It will be seen that the structure of my invention may be employed not only upon trees, but also on poles or building walls or, indeed, on any support or obstruction where side attachment is necessary.

My invention is illustrated in the accompanying drawings, in which,

Fig. 1 is a side elevational view showing the structure of my invention applied to a tree trunk;

Fig. 2 is a front elevational view of the device;

Fig. 3 is a plan view thereof;

Fig. 4 is a front elevational view of the cradle member which will be referred to; and Fig. 5 is a horizontal cross-sectional view, on an enlarged scale, taken on the plane of the line 5—5 of Fig. 2, looking in the direction indicated by the arrows.

The insulator, per se, is shown at 6. It is preferably of porcelain and is provided with a transverse pocket 7 for the reception of the electrical conductors 8, 8 as indicated in Fig. 1. A slot 9 leads into the pocket 7, and re-entrant projections 10, 10 guard the inner end of the slot in order to prevent inadvertent release of the conductors.

Near the top and near the bottom, the insulator 6 is provided with transverse bores 11, 11. By this means the insulator may be attached directly to a tree trunk or limb by means of wires or cables passing through these bores and girdling the trunk or limb. The back of the insulator is curved, as shown, so as better to fit a tree and is preferably fluted.

To avoid girdling, however, I provide a cradle member, preferably of sheet metal, comprising a back 12, preferably curved to follow generally the back of the insulator, forwardly extending side flanges 13, 13, and forwardly extending ears 14, 14. The back is provided with two circular depressions 15, 15, one near the top and the other near the bottom thereof, and in each depression an opening 16 is formed, these openings being for the reception of screws or nails 17, 17, by means of which the cradle member is attached to the tree trunk or limb, as shown in Fig. 1. The heads of the nails or screws are lodged in the depressions, as best shown in Fig. 5. The ears 14, 14 overlap the ends of the bores 11, 11 and are each provided with an opening 18 registering axially with the adjacent bore, thus providing an arrangement whereby bolts 19, with nuts 20, may pass through the bores 11, 11 and the adjacent openings 18, 18 to clamp the insulator in the cradle member, as shown.

The cradle member may be formed of suitable weather-resisting insulating material, but when it is formed of metal it should be formed and proportioned, relative to the insulator, as shown, so that its edges lie well inwardly of the edges of the insulator so that it is impossible for the conductors to touch the metal or to come so close thereto as to permit an arc.

The cradle is first nailed or screwed to the tree trunk or limb, pole, building or other support or obstruction, in the desired position, then the insulator is inserted therein, then the bolts are applied, tightly clamping the insulator in the cradle, and then the conductors are passed through the slot 9 and into the pocket 7.

I claim:

1. An insulator mounting comprising a back piece having a substantially curved surface against which an insulator may be disposed, two pairs of ears extending from the back piece, one pair being adapted to embrace the upper portion of the insulator and the other pair being adapted to embrace the lower portion of the insulator, a member connecting each pair of ears adapted to fasten the insulator to the mounting and means back of each pair of ears for enabling the mounting to be attached to a support.

2. In combination, an insulator having a pocket for receiving a wire conductor, a mounting member comprising a back piece against which the insulator may be disposed, said back piece having connected thereto two pairs of ears extending laterally therefrom, one pair being adapted to embrace the upper portion of the insulator and the other pair being adapted to embrace the lower portion of the insulator, a member connecting each pair of ears and extending through the adjacent portion of the insulator for securing it to the insulator, said members being located directly above and below the pocket in the insulator and a fastening element back of each pair of ears for enabling the mounting to be attached to a suitable support.

In witness whereof, I hereunto subscribe my name this 11th day of August, 1924.

SCOTT C. CUTTER.